April 20, 1948.

G. B. SPRING 2,440,213

STAKING MACHINE

Filed March 2, 1946

INVENTOR.
GEORGE B. SPRING.
BY
ATTORNEY.

April 20, 1948.                G. B. SPRING                2,440,213
                              STAKING MACHINE
                           Filed March 2, 1946              2 Sheets-Sheet 2
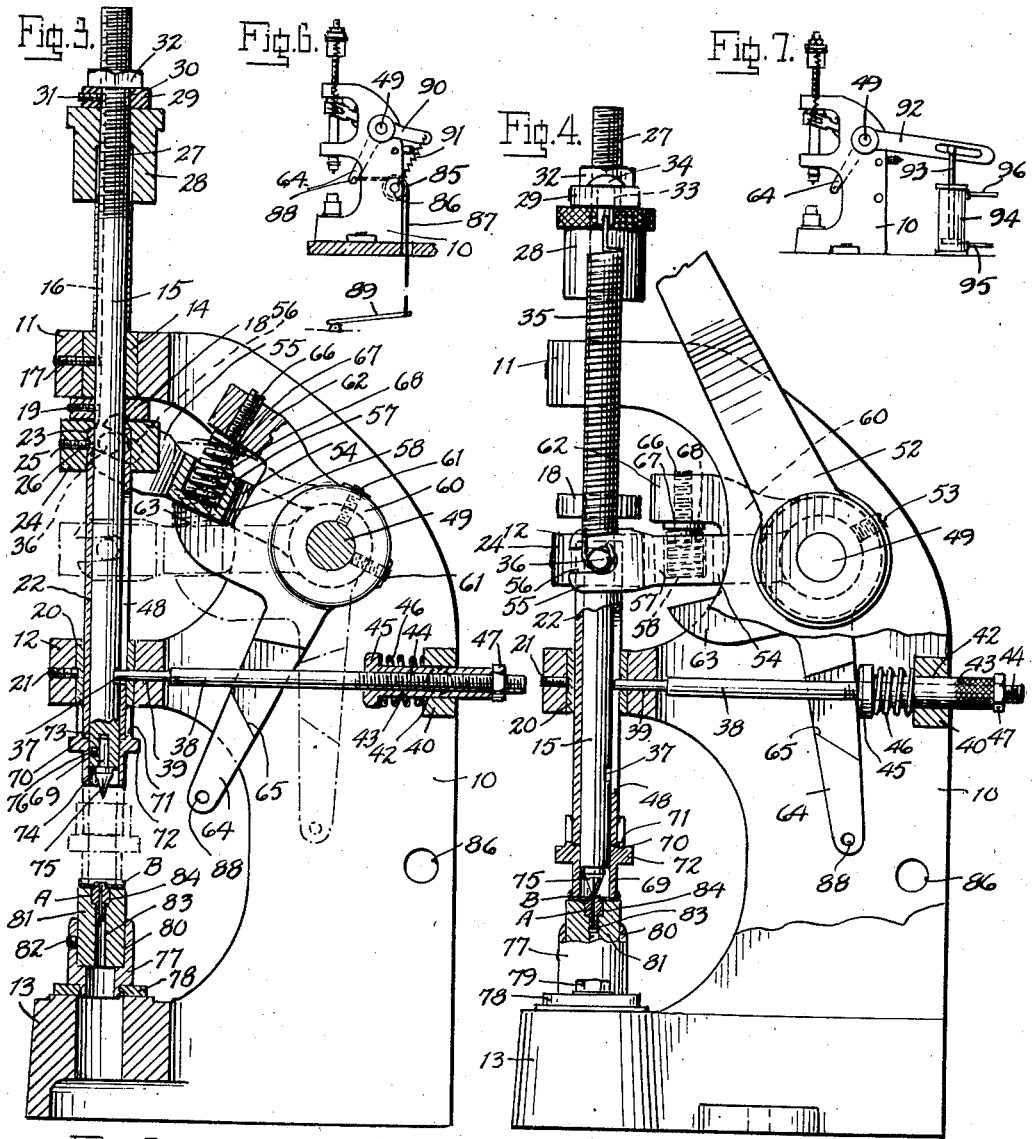
INVENTOR.
GEORGE B. SPRING.
BY
ATTORNEY.

Patented Apr. 20, 1948

2,440,213

UNITED STATES PATENT OFFICE 2,440,213

STAKING MACHINE

George B. Spring, Essex, Conn.; Mary B. Spring executrix of said George B. Spring, deceased Application March 2, 1946, Serial No. 651,517

14 Claims. (Cl. 218—1)

The present invention relates to a staking machine, particularly for use in the staking of small precision parts, such as the shafts and gears used in clocks and the like, an object of the invention being to provide a machine of this character in which the parts to be staked will be securely held during the staking operation so that they will not become bent or displaced, and in which the staking tool is adapted to be engaged with the parts under a pre-determined load, so that exact uniformity in production can be maintained. A further object is to provide a machine in which the respective holding and staking pressures are functions of load means provided in the machine, and are not affected by the manual or other operational pressure applied in the operation of the machine, so that irrespective of the skill or strength of the operator of the machine, the actual holding pressure upon the parts and the impact pressure of the staking tool will be of a constant predetermined order, and may be accurately predetermined between extremely delicate pressures and relatively great pressures.

Another object is to provide a machine in which the holding and staking pressures may be conveniently adjusted depending on the particular work being performed.

Another object is to provide a machine in which the positioning anvil for supporting the parts to be staked, the holding tool, and the staking tool, may be readily removed and replaced by another set of such parts, it being pointed out that these parts are designed as to form and size to cooperate with the particular work being staked. According to the invention the change-over from one set of tools to another can be accomplished in a matter of a few minutes as compared to previous staking machines requiring an hour or more.

With the above and other objects in view, an embodiment of the invention is shown in the accompanying drawings, and this embodiment will be hereinafter more fully described and the invention will be finally pointed out in the claims.

In the drawings:

Fig. 3 is a vertical sectional view, taken along the line 3—3 of Fig. 2, the dot-and-dash lines showing the work holding means moved into holding relation with the work pieces.

Fig. 4 is a side elevation, partially in vertical section showing the staking tool released and engaged with the work pieces.

Fig. 5 is a top plan view of the staking machine.

Fig. 6 is a side elevation, on a reduced scale, showing the machine adapted for operation by a foot pedal.

Fig. 7 is a side elevation, on a reduced scale, showing the machine adapted for automatic operation by an air cylinder.

Figure 1:
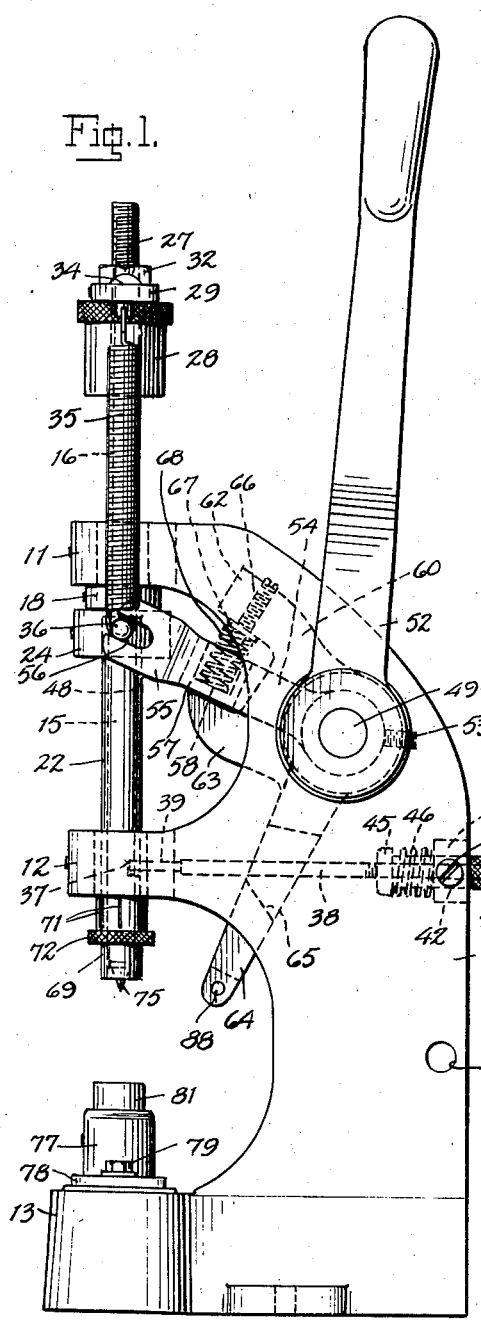
Fig. 1 is a side elevation of a staking machine according to the illustrated exemplary embodiment of the invention.

Referring to the drawings, the staking machine, according to the illustrated exemplary embodiment of the invention, comprises a frame 10 consisting of two spaced parallel vertical side walls provided in transversely connected relation between their forward sides with a forwarding projecting upper bearing portion 11, an intermediate bearing portion 12 in vertical alignment with the upper bearing portion 11, and an anvil supporting base portion 13 in vertical alignment with the bearings 11 and 12. The bearing portion 11 is provided with a bushing 14 in which there is engaged for vertical sliding movement a plunger rod 15, provided in its upper portion with a key slot 16, engaged by a set screw 17 provided in the bearing portion 11, and which set screw also secures the bushing 14 in place. A stop collar 18 is secured upon the plunger rod beneath the bearing portion 11 by means of a set screw 19.

The intermediate bearing portion 12 is provided with a bushing 20 secured by a set screw 21, and is slidingly engaged by a tubular quill 22 which is slidably engaged by the lower portion of the plunger rod 15, the quill being extended a short distance below the bearing portion 12 and the lower end of the plunger rod extending for a distance below the lower end of the quill in the normally raised portion of the quill and rod. The upper end of the quill is engaged in the socket 23 of a head member 24 secured by means of a set screw 25 engaged in an annular groove 26 in the quill, and normally engaged at its upper side with the under side of the stop collar 18 of the plunger rod.

The upper end portion of the plunger rod 15 is threaded, as at 27, and is engaged by a vertical hammer member 28 screwed thereon, and at the upper side of which there is provided upon the plunger rod a cross bar 29 provided with a central aperture 30 for engagement with the rod, and secured against relative rotation by means of a set screw 31 projecting into the key slot 16 of the rod. A securing nut 32 is screwed upon the rod against the upper side of the cross bar. The cross bar projects at each side and is provided at each of its ends with an aperture 33 engaged by a headed stud 34, to the lower projecting end of which the upper end of a compression spring 35 is secured, the lower end of this spring being secured to a horizontally projecting stud shaft 36 provided in the head member 24 at the upper end of the quill.

Figure 2:
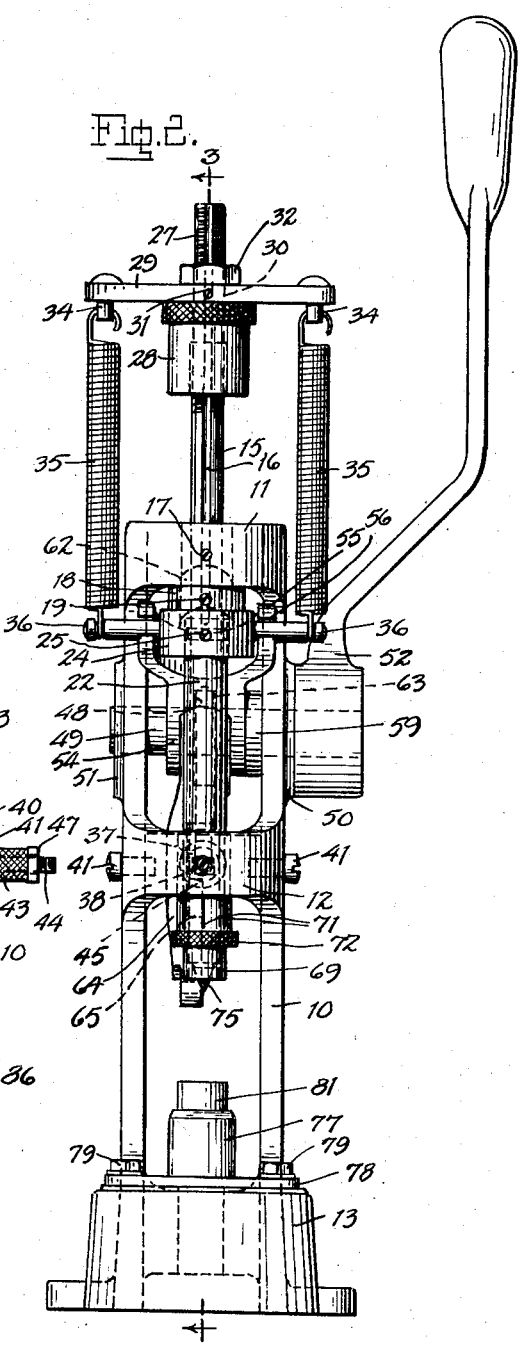
Fig. 2 is a front elevation.

The plunger rod is provided near its lower end and at its rearward side with a detent notch 37 normally engaged, in the raised position of the rod, by the forward reduced end of a horizontally disposed detent rod 38 having bearing at its forward end in a passage 39 in the bearing portion 12 and having bearing at its rearward end in a transverse block member 40 secured between side walls of the frame 10 by means of screws 41, this block member being provided with a cylindrical passage 42 which is slidably engaged by an adjustable sleeve member 43 screwed upon the rearward threaded portion 44 of the detent rod. The forward end of the sleeve 43 is provided with a flange 45, between which and the block 45 a helical spring 46 is engaged about the sleeve and exerts forward pressure upon the detent rod. A lock nut 47 is engaged upon the rearward end of the detent rod to fix the position of adjustment of the sleeve 43. The quill 22 is provided with a slot 48 engaged by the forward end of the detent rod. In the normally raised position of the plunger rod 15, in which position it is releasably held by engagement of the detent rod 38 in the detent notch 37, the springs 35 are slightly extended to draw the quill into its raised position with the head member 24 in engagement with the stop collar 18, as seen in Figs. 1 to 3.

A shaft 49 is journalled in bearing portions 50 and 51 of the side walls of the frame and has an operating handle 52 secured upon one end by means of a set screw 53. Rotatably mounted upon the shaft 49 is a yoke lever 54 provided at its forward end with a fork portion 55, extending about the sides of the head member 24 and provided with slots 56 engaged by stud shafts 36. Intermediate its ends the yoke lever is provided with a platform portion 57 having a spring receiving pocket 58 therein. A spacing collar 59 is provided upon the shaft 49 between one side of the yoke lever and one of the side walls of the frame, and is adapted in cooperation with the handle secured upon the outer end of the shaft to prevent side motion of the shaft.

A compressor member 60 is secured upon the shaft 49 between the spaced hub portions of the yoke member 54 by means of set screws 61, and is provided with a forwardly projecting head portion 62 disposed above the platform portion 57 of the yoke member, a forwardly projecting finger portion 63 projecting beneath and normally engaged with the lower side of the platform portion, and a downwardly extending arm portion 64. The arm portion 64 is disposed at one side of the detent rod 38 forwardly of the flanged end 45 of the sleeve member 43 for the purpose of engaging and pressing the sleeve member to retract the detent rod in the operation of the machine, as will hereinafter more fully appear. The arm portion 64 is provided with a clearance recess 65 for the detent rod 39. In the head portion 62 of the compressor member there is provided an adjustable screw 66 provided at its lower end with a flanged spring supporting stud portion 67, engaged by the upper end of a helical compressor spring 68 seated in the pocket 58 of the platform portions 57 of the yoke member, and which normally presses the yoke member against the finger portion 63 of the compressor member.

Upon the lower end of the quill 22 there is frictionally engaged a work-holding thimble member 69, the passage therethrough being countersunk to provide a pocket 70 for engagement by the quill, the diameter of the passage below the pocket corresponding to the inner diameter of the quill. The surrounding wall of the pocket 70 is provided with vertical slits 71 whereby the thimble is adapted to frictionally engage the quill with a resilient yielding action. Intermediate its ends the thimble is provided with a knurled flange 72 for convenience in engaging it with and removing it from the quill. In the lower end of the plunger rod 15 there is provided a pocket 73 in which the shank 74 of the pointed and grooved staking tool 75 is engaged and secured by a set screw.

Upon the base portion 13 of the frame there is mounted an anvil holding fixture 77 screwed into a plate 78 secured upon the base 13 by means of bolts 79, the fixture 77 being provided with a shouldered pocket 80 in which the anvil member 81 is secured by means of a set screw 82.

The anvil member is shaped to receive the particular work being staked, and as shown in the illustrated embodiment is provided with a central passage 83 having a pocket 84 at its upper end in which the shouldered tubular shaft member A constituting one of the work pieces is seated, the upper end of the anvil having a flat platform surface to receive the other work piece, illustrated as a flanged gear member B to be secured to the shaft member A by staking of the latter, the gear member being provided with a central aperture in which the reduced staking end of the shaft A is engaged preparatory to the staking operation. The thimble member is also shaped for the particular work being done, its lower end being of suitable form to engage upon the upper side of the work pieces to press it securely against the anvil during the staking operation. The staking tool is also designed for the particular staking operation, being of suitable form and size to perform the desired staking operation upon the particular work pieces. The anvil, the thimble, and the staking tool are all readily removable, and in practice constitute a working set for a particular staking operation, it being pointed out that such working sets may be provided for interchangeable use of the machine for the purpose of successively using the same staking machine for staking various forms of work pieces, without any appreciable time loss in adapting the machine for the different work pieces.

In operation, the work pieces A and B are placed upon the anvil, as shown in Figs. 3 and 4, with the reduced end of the work piece A engaged in the hole of the work piece B preparatory to staking. Thereupon the handle 52 is moved forwardly, swinging the compressor member 60 and the yoke lever 54 downwardly to the position shown by the dot-and-dash lines in Fig. 3, and causing the quill 22 to be lowered relatively to the plunger rod 15, the latter remaining in its raised position through the retaining action of the detent rod 38 engaged in the notch 37. As a result of this movement, the thimble 69 is engaged with the work piece B upon the anvil and the springs 35 are stretched and tensioned. In this position further downward movement of the yoke lever is prevented, and as the movement of the handle is continued the compressor member 60 is moved relatively to the yoke lever causing the spring 68 to be compressed, the degree of pressure required to compress this spring determining the holding pressure of the thimble upon the work piece B. This pressure may be adjusted by means of the adjustable screw 66, being increased or diminished as required for the particular work being done. At the end of the forward movement of the handle, the arm 64 of the compressor member contacts the flange 45 of the sleeve 43 provided on the detent rod 38, causing the detent rod to be retracted from the notch 37 and releasing the plunger rod 15. The released plunger rod drops under the spring load of the springs 35 forcibly engaging the staking tool 75 with the end of the work piece A, thus staking the work pieces A and B together. To retract the quill and plunger rod, the handle is moved upwardly to the point where the detent rod re-engages the notch 37 of the plunger rod, the springs 35 at this point being under slight tension so that the quill is held in its raised position with the upper end of the head 24 in engagement with the collar 18 of the plunger rod.

The point at which the arm 64 trips the detent rod may be adjusted by adjustment of the sleeve 43 on the rod. The spring load upon the plunger rod may be adjusted as desired by raising or lowering the cross bar 29 on the plunger rod, or by substituting springs of different size. For delicate staking work the springs 35 may be removed and the load impact applied to the plunger rod 15 by the adjustable hammer member 28 alone. The distance of fall of the rod may be predetermined by adjustment of the hammer member, and the hammer may be readily replaced by other hammer members of different weights.

In Fig. 6 there is shown the manner in which the staking machine is adapted to be operated by a foot pedal. For this purpose a pulley wheel 85 is mounted in the bearing holes 86 provided in the frame, and a sprocket chain 87 is connected to the apertured end 88 of the arm 64 of the compressor member 60, and is carried over the pulley wheel to a foot pedal 89 mounted on the floor. In place of the hand lever 52, a lever arm 90 is mounted on the shaft 49, and is connected to the frame 90 by a spring 91. By depressing the foot pedal actuating movement is imparted to the compressor member, return movement being imparted thereto by the spring 91.

In Fig. 7 there is shown the manner in which the staking machine is adapted to be power operated by an air cylinder. For this purpose a slotted lever arm 92 is mounted upon the shaft 49, and is connected to the vertically disposed piston rod 93 of the air cylinder 94, to the respective ends of which air is adapted to be conducted through conduits 95 and 96. The supply of air is controlled by a suitable valve, so that by the operation of this valve actuating and return movement is imparted to the compressor member.

I have illustrated and described a preferred and satisfactory embodiment of the invention, but it will be understood that changes may be made therein, within the spirit and scope thereof, as defined in the appended claims.

Having thus described my invention, what I claim and desire to secure by Letters Patent is:

1. In a staking machine, a frame, a work-supporting anvil carried thereby, a work-holding member reciprocably mounted in said frame, a reciprocal work-staking member, retaining means engageable with said work-staking member to releaseably retain it in a relatively extended position with respect to said work-holding member, actuating means adapted to impart projecting movement to said work-holding member to engage it with a work piece on said anvil, and means associated with said actuating means adapted at a predetermined point in the movement of said actuating means to operate said retaining means to release said work staking member.

2. In a staking machine, a frame, a work-supporting anvil carried thereby, a work-holding member reciprocably mounted in said frame, a reciprocal work-staking member, retaining means engageable with said work-staking member to releaseably retain it in a relatively extended position with respect to said work-holding member, spring means connected between said work-holding member and said work-staking member, actuating means adapted to impart projecting movement to said work-holding member to engage it with a work piece on said anvil and whereby said spring means is tensioned, and means associated with said actuating means adapted at a predetermined point in the movement of said actuating means to operate said retaining means to release said work staking member.

3. In a staking machine, a frame, a work-supporting anvil carried thereby, a work-holding member reciprocably mounted in said frame, a reciprocal work-staking member, retaining means engageable with said work-staking member to releasably retain it in a relatively extended position with respect to said work-holding member, a hammer member removably mounted on said work-staking member, actuating means adapted to impart projecting movement to said work-holding member to engage it with a work piece on said anvil, and means associated with said actuating means adapted at a predetermined point in the movement of said actuating means to operate said retaining means to release said work-staking member.

4. In a staking machine, a frame, a work-supporting anvil carried thereby, a work-holding member reciprocably mounted in said frame, a reciprocal work-staking member, retaining means engageable with said work-staking member to releasably retain it in a relatively extended position with respect to said work-holding member, a hammer member adjustably mounted on said work-staking member, actuating means adapted to impart projecting movement to said work-holding member to engage it with a work piece on said anvil, and means associated with said actuating means adapted at a predetermined point in the movement of said actuating means to operate said retaining means to release said work staking member.

5. In a staking machine, a frame, a work-supporting anvil carried thereby, a work-holding quill slidably mounted in said frame, a work-staking plunger slidable within said quill, detent means engageable with said plunger to releasably retain it in a relatively extended position with respect to said quill, actuating means adapted to impart projecting movement to said quill to engage it with a work piece on said anvil, and trip means associated with said actuating means adapted at a predetermined point in the movement of said actuating means to operate said detent means to release said plunger.

6. In staking machine, a frame, a work-supporting anvil carried thereby, a work-holding quill slidably mounted in said frame, a work-staking plunger slidable within said quill, detent means engageable with said plunger to releasably retain it in a relatively extended position with respect to said quill, spring means connected between said quill and said plunger, actuating means adapted to impart projecting movement to said quill to engage it with a work piece on said anvil and whereby said spring means is tensioned, and trip means associated with said actuating means adapted at a predetermined point in the movement of said actuating means to operate said detent means to release said plunger.

7. In a staking machine, a frame, a work-supporting anvil carried thereby, a work-holding quill slidably mounted for vertical movement in said frame, a work-staking plunger slidable within said quill, and extending substantially above the upper end of said quill, detent means engageable with said plunger to releasably retain it in a relatively extended position with respect to said quill, actuating means adapted to impart downward projecting movement to said quill to engage it with a work piece on said anvil, and trip means associated with said actuating means adapted at a predetermined point in the movement of said actuating means to operate said detent means to release said plunger.

8. In a staking machine, a frame, a work-supporting anvil carried thereby, a work-holding quill slidably mounted for vertical movement in said frame, a work-staking plunger slidable within said quill, and extending substantially above the upper end of said quill, detent means engageable with said plunger to releasably retain it in a relatively extended position with respect to said quill, a vertically adjustable member mounted on the upper end portion of said plunger, spring means connected between said quill and said vertically adjustable member, actuating means adapted to impart downward projecting movement to said quill to engage it with a work piece on said anvil and whereby said spring means is extended and tensioned, and trip means associated with said actuating means adapted at a predetermined point in the movement of said actuating means to operate said detent means to release said plunger.

9. In a staking machine, a frame, a work-supporting anvil carried thereby, a work-holding quill slidably mounted in said frame, a work-holding thimble removably engaged with the lower end of said quill, a work-staking plunger slidable within said quill, detent means engageable with said plunger to releaseably retain it in a relatively extended position with respect to said quill, actuating means adapted to impart projecting movement to said quill to engage it with a work piece on said anvil, and trip means associated with said actuating means adapted at a predetermined point in the movement of said actuating means to operate said detent means to release said plunger.

10. In a staking machine, a frame, an anvil support secured to said frame, a work-supporting anvil removably engaged with said support, a work-holding quill slidably mounted in said frame, a work-staking plunger slidable within said quill, detent means engageable with said plunger to releasably retain it in a relatively extended position with respect to said quill, actuating means adapted to impart projecting movement to said quill to engage it with a work piece on said anvil, and trip means associated with said actuating means adapted at a predetermined point in the movement of said actuating means to operate said detent means to release said plunger.

11. In a staking machine, a frame, a work-supporting anvil carried thereby, a work-holding quill slidably mounted in said frame, a work-staking plunger slidable within said quill, a staking tool removably engaged with the lower end of said plunger, detent means engageable with said plunger to releaseably retain it in a relatively extended position with respect to said quill, actuating means adapted to impart projecting movement to said quill to engage it with a work piece on said anvil, and trip means associated with said actuating means adapted at a predetermined point in the movement of said actuating means to operate said detent means to release said plunger.

12. In a staking machine, a frame, a work-supporting anvil carried thereby, a work-holding quill slidably mounted in said frame, a work-staking plunger slidable within said quill, and extending substantially above the upper end of said quill, a stop collar carried by said plunger and normally engaged by the upper end of said quill, detent means engageable with said plunger to releaseably retain it in a relatively extended position with respect to said quill, actuating means adapted to impart projecting movement to said quill to engage it with a work piece on said anvil, and trip means associated with said actuating means adapted at a predetermined point in the movement of said actuating means to operate said detent means to release said plunger.

13. In a staking machine, a frame, a work-supporting anvil carried thereby, a work-holding quill slidably mounted in said frame, a work-staking plunger slidable within said quill, detent means engageable with said plunger to releaseably retain it in a relatively extended position with respect to said quill, an actuating compressor member mounted in said frame, an actuating lever member yieldably associated with said compressor member, a compressor spring interposed between said compressor member and said lever member, said lever member being adapted to impart projecting movement to said quill to engage it with a work piece on said anvil, said compressor member being adapted to have relative compression movement with respect to said lever member against the force of said interposed compressor spring, and trip means associated with said compressor member adapted at a predetermined point in its movement to operate said detent means to release said plunger.

14. In a staking machine, a frame, a work-supporting anvil carried thereby, a work-holding quill slidably mounted in said frame, a work-staking plunger slidable within said quill, detent means engageable with said plunger to releaseably retain it in a relatively extended position with respect to said quill, an actuating compressor member mounted in said frame, an actuating lever member yieldably associated with said compressor member, a compressor spring interposed between said compressor member and said lever member, tension adjustment means for said compressor spring, said lever member being adapted to impart projecting movement to said quill to engage it with a work piece on said anvil, said compressor member being adapted to have relative compression movement with respect to said lever member against the force of said interposed compressor spring, and trip means associated with said compressor member adapted at a predetermined point in its movement to operate said detent means to release said plunger.

GEORGE B. SPRING.